United States Patent [19]

Halm et al.

[11] Patent Number: 5,176,892

[45] Date of Patent: * Jan. 5, 1993

[54] SUPPORTED METAL CATALYZED PRODUCTION OF TETRACHLOROSILANE

[75] Inventors: Roland L. Halm, Madison, Ind.; Brian M. Naasz, LaGrange; Regie H. Zapp, Carrollton, both of Ky.

[73] Assignee: Dow Corning Corporation, Midland, Mich.

[*] Notice: The portion of the term of this patent subsequent to Nov. 3, 2009 has been disclaimed.

[21] Appl. No.: 622,913

[22] Filed: Dec. 6, 1990

[51] Int. Cl.⁵ .............................................. C01B 33/08
[52] U.S. Cl. ...................................... 423/342; 423/347; 502/262; 502/337; 502/339
[58] Field of Search ............... 423/342, 347; 502/232, 502/262, 407, 412, 413, 337, 339

[56] References Cited

U.S. PATENT DOCUMENTS

| | | | |
|---|---|---|---|
| 2,865,706 | 12/1958 | Fitch et al. | 423/342 |
| 3,133,109 | 5/1964 | Dotson | 423/342 |
| 3,637,529 | 1/1972 | Van Beeck et al. | 502/337 |
| 4,044,109 | 8/1977 | Kotzsch et al. | 423/342 |
| 4,059,541 | 11/1977 | Petrow et al. | 502/339 |
| 4,585,643 | 4/1986 | Barker, Jr. | 423/342 |
| 4,797,380 | 1/1989 | Motoo et al. | 502/339 |
| 5,008,234 | 4/1991 | Ozin et al. | 502/339 |
| 5,030,608 | 7/1991 | Schubert et al. | 502/339 |

FOREIGN PATENT DOCUMENTS

| | | |
|---|---|---|
| 0107432 | 5/1984 | European Pat. Off. |
| 57-156319 | 9/1982 | Japan |
| 945618 | 1/1964 | United Kingdom |
| 1530986 | 11/1978 | United Kingdom |

*Primary Examiner*—Olik Chaudhuri
*Assistant Examiner*—Ken Horton
*Attorney, Agent, or Firm*—William F. Boley

[57] ABSTRACT

The present invention is a process for the production of silanes from the contact of silicon metal or a silicon containing material with hydrogen chloride. The described process employs a metal or metal compound on a solid support as a catalyst which increases the production of tetrachlorosilane. The metal or metal compound is selected from a group consisting of palladium and palladium compounds, rhodium and rhodium compounds, platinum and platinum compounds, iridium and iridium compounds, tin and tin compounds, nickel and nickel compounds, and aluminum and aluminum compounds. The process is run at a temperature of about 250° C. to 500° C.

20 Claims, No Drawings

SUPPORTED METAL CATALYZED PRODUCTION OF TETRACHLOROSILANE

BACKGROUND OF INVENTION

The present invention is a process for the production of silanes from the reaction of hydrogen chloride with silicon metal or a silicon containing material. The process employs a catalyst comprising a metal or metal compound on a solid support. The catalyst increases yield of tetrachlorosilane, in the described process.

Much of the prior art is concerned with optimizing the reaction of hydrogen chloride with silicon metal to form trichlorosilane and minimize production of other silanes, such as tetrachlorosilane. However, tetrachlorosilane is finding increasing industrial uses and, therefore, it is desirable to develop economical means for increasing tetrachlorosilane production from the reaction of hydrogen chloride and silicon metal or a silicon containing material.

British Patent No. 945,618, Published Jan. 2, 1964, describes a process for reacting metallic silicon with gaseous hydrogen chloride in the presence of a copper or copper-containing catalyst. The process is run at a temperature of 170° C. to 350° C. The process is reported to yield about 90% trichlorosilane with less than about 5% tetrachlorosilane being formed.

British Patent No. 1,530,986, Published Nov. 1, 1978, describes a method for the preparation of trichlorosilane and tetrachlorosilane by reaction of silicon or silicon-containing materials with hydrogen chloride in a fluidized bed at temperatures of from 250° C. to 500° C. The reaction is carried out in the presence of from 0.2 to 10 parts by volume of gaseous silicon tetrachloride per part by volume of hydrogen chloride. Gaseous silicon tetrachloride is fed to the reactor both as a diluent for the gaseous hydrogen chloride and to maintain the homogeneity of the fluid bed.

None of the cited art teaches a metal or metal compound on a solid support as a catalyst effective in increasing the production of tetrachlorosilane from the reaction of hydrogen chloride with silicon metal or a silicon containing material.

SUMMARY OF THE INVENTION

The present invention is a process for the production of silanes from the contact of silicon metal or a silicon containing material with hydrogen chloride. The described process employs a metal or metal compound on a solid support as a catalyst which increases the production of tetrachlorosilane. The metal or metal compound is selected from a group consisting of palladium and palladium compounds, rhodium and rhodium compounds, platinum and platinum compounds, iridium and iridium compounds, tin and tin compounds, nickel and nickel compounds, and aluminum and aluminum compounds. The process is run at a temperature of about 250° C. to 500° C.

DESCRIPTION OF THE INVENTION

The present invention is a catalyzed process for preparing silanes of formula $H_n SiCl_{4-n}$, where n is an integer from zero to four. The described process is especially useful for the production of tetrachlorosilane. The process comprises contacting silicon with hydrogen chloride in the presence of an effective concentration of a catalyst, at a temperature of about 250° C. to 500° C.

The described process can be used to prepare silane ($SiH_4$), chlorosilane dichlorosilane, trichlorosilane, and tetrachlorosilane. However, the catalysts described herein preferentially select for the production of tetrachlorosilane. Therefore, tetrachlorosilane is a preferred product of the process.

The silicon can be in the form of silicon metal or a silicon containing material. The term "silicon metal" refers to a metalloid type material consisting of elemental silicon. The term "silicon containing material" refers to alloys or intermetallic compounds of elemental silicon with, for example, iron, copper, or carbon. Preferred are alloys and intermetallic compounds comprising greater than 50 percent by weight of elemental silicon.

The silicon is contacted with hydrogen chloride in the presence of an effective concentration of a catalyst. The surface area of the silicon is important in determining the rate of reaction of the silicon with hydrogen chloride. Therefore, the silicon should be finely divided or powdered. The silicon can be, for example, ground or atomized silicon. It is preferred that the particle size of the silicon be less than 100 mesh. Larger particle sizes of silicon may be used, but the conversion rate to product silanes may be reduced. The lower limit of the silicon particle size is determined by the ability to produce and handle the silicon.

Useful catalysts, for the described process, are those which increase the yield of the process for the production of tetrachlorosilane. The catalyst comprises metals and metal compounds bound to a solid support. Metals and metal compounds useful in the described process are, for example, palladium and palladium compounds, rhodium and rhodium compounds platinum and platinum compounds, iridium and iridium compounds, tin and tin compounds, nickel and nickel compounds, and aluminum and aluminum compounds.

The metal compounds can be, for example, inorganic oxide and halide compounds of the described metals. The inorganic metal compounds can be, for example, $PdBr_2$, $PdCl_2$, POD, $RhCl_3$, $RhO_2$, $Rh_2O_3$, $PtF_4$, $PtF_6$, $PtOp_2$, $IrBr_3$, $IrCl_3$, $IrO_2$, $SnCl_4$, $SnO_2$, $NiBr_2$, $NiCl_2$, $Al_2O_3$, $AlCl_3$, and $AlF_3$.

The preferred metals and metal compounds are selected from the group consisting of palladium and palladium compounds, rhodium and rhodium compounds, platinum and platinum compounds, and iridium and iridium compounds. The most preferred metal is palladium.

The solid support for the metal or metal compound can be any particulate material which is stable under the process conditions, is not detrimental to the reaction, and to which the metal or metal compound can be bound. The solid support material can be, for example, carbon, activated carbon, graphite, alumina, silica-alumina, diatomaceous earth, or silica. The preferred solid support materials are activated carbon and alumina. Activated carbon is the most preferred support material. The physical form of the support material is that of a particulate powder. The available surface area of the solid support must be adequate to bind the desired level of catalyst. It is preferred that the solid support material have an intrinsic surface area within the range of 10 to 1500 $m^2/g$.

The method of binding of the metal or metal compound to the solid support is not considered critical to the described process. Any method of binding which retains the metal or metal compound in contact with the solid support under the process conditions is acceptable. In general, it has been found that the higher the level of metal or metal compound bound to the solid support, the more efficient the catalyst. Therefore, less total catalyst is required in the process for the same level of catalytic activity. A useful weight of metal or metal compound bound to solid support is within the range of 0.5 to 15 weight percent of the combined metal or metal compound and solid support material. A preferred weight of metal or metal compound bound to solid support is one to ten weight percent of the combined metal or metal compound and solid support material.

By "effective concentration of a catalyst on a solid support," it is meant a concentration of catalyst which increases the yield of the described process for the production of tetrachlorosilane over the yield obtained in the absence of a catalyst. Preferred are those catalyst which increase the yield of tetrachlorosilane by at least 10 percent over the yield obtained in an uncatalyzed process. The term "yield" refers to the absolute amount of tetrachlorosilane produced.

The effective concentration of catalyst depends upon the amount and type of metal or metal compound bound to the solid support material, as well as the type of solid support material. In general, metal concentration, either as elemental metal or in the form of a metal compound, in the range of 25 to 4000 parts per million (ppm) metal, based on total initial weight of solids charged to the reactor, have been found useful. The initial weight of solids charged to the reactor include the weights of silicon, solid support material, and metal or metal compound. A preferred concentration for metal is about 100 to 2000 ppm. Contact of the silicon and catalyst with hydrogen chloride may be effected in standard type reactors for contacting solid and gaseous reactants. The reactor may be, for example, a fixed-bed reactor, a stirred-bed reactor, or a fluidized-bed reactor. It is preferred that the reactor containing the silicon and catalyst mixture be purged with an inert gas, such as nitrogen or argon, prior to introduction of the hydrogen chloride. This purging is to remove oxygen and prevent oxidation of silicon and formation of other detrimental oxygenates.

The required contact time for the hydrogen chloride to react with the silicon will depend upon such factors as the temperature at which the reaction is run and the type and concentration of catalyst employed. In general, contact times in the range of 0.1 to 100 seconds have been found useful.

The described process can be run at a temperature of about 250° C. to 500° C. However, a preferred temperature for running the process is about 270° C. to 400° C.

Recovery of the product silanes can be by standard means, for example, by condensation in a cold trap.

So that those skilled in the art may better understand the described invention, the following examples are offered for illustration. These examples are not intended to be limiting on the process described herein.

Examples. Selected metals, metal compounds, and solid support materials were evaluated for their ability to catalyze the reaction of hydrogen chloride with silicon to form tetrachlorosilane. The process was conducted in a fluid-bed reactor of conventional design, similar to that described by Dotson U.S. Pat. No. 3,133,109, issued May 12, 1964. For each test run, a mixture of ground metallurgical grade silicon metal (Elkem Metals Company, Alloy, W. Va.) and the potential catalyst was formed. The mixture was formed by placing the silicon and potential catalyst material in a glass vessel and shaking. The prepared mixture was then added to the reactor. The reactor, charged with the test mixture of silicon and catalyst, was purged with nitrogen gas for about 30 minutes. The reactor temperature, for each run, was maintained at the temperature specified in Table 1.

Hydrogen Chloride was fed to the reactor at a rate of 8–10 g/h for a period of about 20 hours. Products were collected continuously throughout the 20 hours run in a cold trap. The collected product was analyzed by gas liquid chromatography to determine the amounts and types of silanes produced. The weight difference of the reactor before and after each run was used as an indication of silicon conversion.

Materials tested as catalysts, their supports, and the initial concentration of metal or metal compound present in relation to total solids charged to the reactor are presented in Table 1. The sources of materials tested, as indicated in Table 1, are: Alfa Research Chemicals, Danvers, Mass.; Calgon Corporation, Pittsburgh, Pa.; Dow Corning Corporation (D.C.), Midland, Mich.; Degussa Corporation, S. Plainfield, N.J.; Engelhard Corporation, Edison, N.J.; and United Catalyst Inc. (UCI), Louisville, Ky. The support materials tested are labelled in Table 1 as: activated carbon (Act. C), alumina, Silica-alumina (Si—Al), graphite, and diatomaceous earth (d-earth).

The results of this series of runs is presented in Table 1 under the heading "Product." Under the subheadings "HSiCl$_4$" and "SiCl$_4$" are listed the weight percent of these two products in relation to total recovered products. Under the heading "Si-Conv" is presented the percent of silicon metal consumed during the process as determined by the reduction in weight of silicon initially added to the reactor. The heading "P.I." is a performance index calculated as "SiCl" multiplied by "Si-Conv"/100. The first line of data represents a baseline for a process in which no catalyst or support material was present. The values presented for the baseline are the average values of four separate runs. All other values are the average values of two separate runs.

TABLE 1

Effect of Metals on a Solid Support as Catalyst For Tetrachlorosilane Production

| Catalyst | | | | Product | | | |
|---|---|---|---|---|---|---|---|
| Type | Source | Conc.* (ppm) | Temp. (°C.) | HSiCl$_3$ | SiCl$_4$ | Si-Conv | P.I. |
| None | — | — | 315 | 87.1 | 12.0 | 93.0 | 11.2 |
| 1% Pd/Act. C | Alfa | 1000 | 315 | 31.1 | 68.5 | 82.5 | 56.5 |
| 5% Pd/Act. C | Alfa | 1000 | 315 | 4.2 | 94.8 | 92.0 | 87.3 |
| 5% Pd/Act. C | Alfa | 500 | 315 | 3.4 | 93.5 | 89.6 | 83.7 |
| 5% Pd/Act. C | Degussa | 250 | 315 | 17.2 | 81.0 | 83.3 | 67.5 |
| 5% Pd/Act. C | Alfa | 250 | 315 | 29.8 | 67.0 | 94.8 | 63.5 |

TABLE 1-continued

Effect of Metals on a Solid Support as Catalyst For Tetrachlorosilane Production

| Catalyst | | | | Product | | | |
|---|---|---|---|---|---|---|---|
| Type | Source | Conc.* (ppm) | Temp. (°C.) | HSiCl₃ | SiCl₄ | Si-Conv | P.I. |
| 5% Pd/Act. C | Degussa | 100 | 315 | 25.1 | 74.1 | 86.9 | 64.3 |
| 5% Pd/Act. C | Degussa | 100 | 350 | 25.9 | 72.2 | 92.3 | 66.6 |
| 5% Pd/Act. C | Degussa | 100 | 350 | 53.4 | 44.9 | 87.5 | 39.3 |
| 10% Pd/Act. C | Degussa | 50 | 350 | 60.4 | 38.8 | 88.2 | 34.2 |
| 10% Pd/Act. C | Degussa | 100 | 350 | 19.1 | 79.8 | 90.0 | 71.8 |
| 5% Pd/alumina | UCI | 100 | 315 | 43.9 | 55.0 | 87.9 | 48.3 |
| 5% Pd/alumina | Degussa | 100 | 350 | 60.3 | 37.4 | 93.0 | 34.7 |
| 1% Pd/Si—Al | Engelhard | 1000 | 315 | 56.1 | 42.7 | 86.1 | 36.8 |
| 1% Pd/graphite | Engelhard | 2000 | 315 | 23.5 | 75.4 | 70.1 | 52.8 |
| 1% Pd/graphite | Alfa | 500 | 315 | 46.1 | 53.1 | 87.6 | 46.4 |
| 1% Pd/d-earth | Engelhard | 500 | 315 | 60.4 | 37.8 | 82.6 | 31.2 |
| 1% Pd/d-earth | Engelhard | 1000 | 315 | 12.7 | 85.8 | 54.4 | 46.6 |
| 2% Sn/Act. C | Engelhard | 500 | 315 | 69.1 | 29.1 | 91.8 | 26.7 |
| 3% Sn/Act. C | Engelhard | 100 | 315 | 58.6 | 40.5 | 95.1 | 38.5 |
| 5% Sn/Act. C | DC | 1000 | 315 | 70.4 | 28.7 | 90.4 | 25.9 |
| 4% AlCl₃/Act. C | Calgon | 1000 | 315 | 63.1 | 33.1 | 95.5 | 31.6 |
| 10% Ni/graphite | Alfa | 1000 | 315 | 83.0 | 15.0 | 92.4 | 13.9 |
| 10% Ni/graphite | Alfa | 2000 | 315 | 97.7 | 19.4 | 95.5 | 18.5 |
| 10% Ni/graphite | Alfa | 4000 | 315 | 77.5 | 17.7 | 83.5 | 14.8 |
| 10% Graphite | Calgon | — | 315 | 86.4 | 12.9 | 93.3 | 12.0 |
| 1% Act. C | Calgon | — | 315 | 85.2 | 14.0 | 6.5 | 0.9 |
| 9% Act. C | Calgon | — | 315 | 0.0 | 0.0 | 0.0 | 0.0 |
| 2% Act. C | Engelhard | — | 315 | 69.1 | 29.1 | 91.8 | 26.7 |

*Concentration are expressed as ppm metal

What is claimed is:

1. A process for preparing silanes of formula $H_n SiCl_{4-n}$, where n is an integer from zero to four, the process comprising: contacting silicon with hydrogen chloride in the presence of an effective concentration of a catalyst on a solid support, where the catalyst on the solid support improves yield of tetrachlorosilane, at a temperature of about 250° C. to 500° C.

2. A process according to claim 1, where the catalyst comprises a metal or metal compound selected from a group consisting of palladium and palladium compounds, rhodium and rhodium compounds, platinum and platinum compounds, iridium and iridium compounds, tin and tin compounds, nickel and nickel compounds, and aluminum and aluminum compounds; on a solid support.

3. A process according to claim 2, where the metal or metal compound is selected from a group consisting of palladium and palladium compounds, rhodium and rhodium compounds, platinum and platinum compounds, and iridium and iridium compounds.

4. A process according to claim 2, where the metal is palladium.

5. A process according to claim 2, where the solid support is selected from a group consisting of carbon, activated carbon, graphite, alumina, silica-alumina, diatomaceous earth, and silica.

6. A process according to claim 2, where the solid support is selected from a group consisting of activated carbon and alumina.

7. A process according to claim 2, where the solid support is activated carbon.

8. A process according to claim 3, where the solid support is selected from a group consisting of activated carbon and alumina.

9. A process according to claim 1, where the catalyst comprises palladium supported on activated carbon.

10. A process according to claim 1, where the temperature is 270° C. to 400° C.

11. A process according to claim 3, where the metal or metal compound is present on the solid support at a weight of 0.5 to 15 weight percent of the combined weights of the metal or metal compound and solid support.

12. A process according to claim 3, where the metal or metal compound is present on the solid support at a weight of one to ten weight percent of the combined weight of the metal or metal compound and solid support.

13. A process according to claim 3, where concentration of metal is within a range of 25 to 4000 ppm of total solids.

14. A process according to claim 3, where concentration of metal is within a range of 100 to 2000 ppm of total solids.

15. A process according to claim 3, where the metal or metal compound is present on the solid support at a weight of one to ten weight percent of combined weight of the metal or metal compound and solid support, and concentration of metal is within a range of 100 to 2000 ppm of total solids.

16. A process according to claim 15, where the metal is palladium, the solid support is activated carbon, and the temperature is within a range of 270° C. to 400° C.

17. A process according to claim 16, where the silane is tetrachlorosilane.

18. A process according to claim 1, where the silane is tetrachlorosilane.

19. A process according to claim 1, where the silicon is silicon metal.

20. A process according to claim 1, where the silicon is silicon metal and the catalyst comprises palladium on activated carbon.

* * * * *